United States Patent
Kaikkonen et al.

(10) Patent No.: US 12,108,380 B2
(45) Date of Patent: Oct. 1, 2024

(54) METHOD OF USER EQUIPMENT POWER SAVINGS USING GROUPS OF CELLS, AND NETWORK NODE THEREOF

(71) Applicant: Nokia Technologies Oy, Espoo (FI)

(72) Inventors: Jorma Kaikkonen, Oulu (FI); Samuli Turtinen, Ii (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 27 days.

(21) Appl. No.: 17/191,907

(22) Filed: Mar. 4, 2021

(65) Prior Publication Data

US 2021/0282160 A1    Sep. 9, 2021

Related U.S. Application Data

(60) Provisional application No. 62/985,456, filed on Mar. 5, 2020.

(51) Int. Cl.
| | | |
|---|---|---|
| H04W 72/04 | (2023.01) | |
| H04W 72/121 | (2023.01) | |
| H04W 72/23 | (2023.01) | |
| H04W 76/28 | (2018.01) | |
| H04W 84/04 | (2009.01) | |

(52) U.S. Cl.
CPC ......... *H04W 72/121* (2013.01); *H04W 72/23* (2023.01); *H04W 76/28* (2018.02); *H04W 84/042* (2013.01)

(58) Field of Classification Search
None
See application file for complete search history.

(56) References Cited

U.S. PATENT DOCUMENTS

| | | | |
|---|---|---|---|
| 10,912,026 B2* | 2/2021 | Jose | H04W 76/15 |
| 2011/0170420 A1 | 7/2011 | Xi et al. | |
| 2019/0254110 A1* | 8/2019 | He | H04L 41/0896 |
| 2019/0297571 A1 | 9/2019 | Jose et al. | |
| 2022/0408515 A1* | 12/2022 | Li | H04W 52/0216 |

FOREIGN PATENT DOCUMENTS

| | | |
|---|---|---|
| JP | 2013-516927 A | 5/2013 |
| JP | 2015089022 A | 5/2015 |
| JP | 2017-536036 A | 11/2017 |

(Continued)

OTHER PUBLICATIONS

International Search Report and Written Opinion received for corresponding Patent Cooperation Treaty Application No. PCT/IB2021/051827, dated Jun. 7, 2021, 13 pages.

(Continued)

*Primary Examiner* — Willie J Daniel, Jr.
(74) *Attorney, Agent, or Firm* — Lippes Mathias LLP

(57) ABSTRACT

The method includes conducting communications with a first group of cells, and receiving a first indicator, the first indicator notifying the user equipment (UE) to enable scheduling with at least one second group of cells. The method further includes starting a first inactivity timer associated with the at least one second group of cells based on the first indicator, and scheduling communications with the at least one second group of cells following the starting of the first inactivity timer. The network node performs the method.

22 Claims, 6 Drawing Sheets

(56) References Cited

FOREIGN PATENT DOCUMENTS

| WO | 2014/128805 A1 | 8/2014 |
|---|---|---|
| WO | 2014/185213 A1 | 11/2014 |
| WO | 2016/064534 A1 | 4/2016 |
| WO | 2019/101215 A1 | 5/2019 |

OTHER PUBLICATIONS

"New WID: UE Power Saving in NR", 3GPP TSG RAN Meetings #84, RP-191607, Agenda : 9.4.6, CATT, Jun. 3-6, 2019, 5 pages.
"3rd Generation Partnership Project; Technical Specification Group Radio Access Network; NR; Physical layer procedures for control (Release 16)", 3GPP TS 38.213, V16.0.0, Dec. 2019, pp. 1-146.
"LS on Secondary DRX Group", 3GPP TSG-RAN2 Meeting #108, R2-1916597, 3GPP RAN WG2, Nov. 18-22, 2019, 2 pages.
"Maintenance of PDCCH-based Power Saving Signal", 3GPP TSG RAN WG1 #100, R1-2000337, vivo, Agenda : 7.2.7.1, Feb. 24-Mar. 6, 2020, 18 pages.
"Remaining Details of PDCCH-based Power Saving Signal/Channel", 3GPP TSG-RAN WG1 #100, R1-2000742, Agenda : 7.2.7.1, Intel Corporation, Feb. 24-Mar. 6, 2020, pp. 1-5.
"On Secondary DRX Group", 3GPP TSG-RAN WG1 Meeting #100-e, Tdoc R1-2001084, Agenda : 5, Ericsson, Feb. 24-Mar. 6, 2020, pp. 1-4.
"Draft LS Response on Secondary DRX Group", 3GPP TSG-RAN WG1 #100-e, R1-2001083, Ericsson [RAN1], Feb. 24-Mar. 6, 2020, 1 page.
"[Draft] Reply LS on Secondary DRX Group", 3GPP TSG RAN WG1 meeting #100, R1-2000510, ZTE [3GPP RAN WG1], Feb. 24-Mar. 6, 2020, 2 pages.
Patent Cooperation Treaty Application No. PCT/CN2020/074950, "Determination of Active Time with Discontinuous Reception Groups", filed on Feb. 12, 2020, 36 pages.
U.S. Appl. No. 62/975,356, "Method for Enabling Secondary Cell Dormancy for User Equipment Power Savings", filed on Feb. 12, 2020, 25 pages.
"3rd Generation Partnership Project; Technical Specification Group Radio Access Network; NR;Medium Access Control (MAC) protocol specification(Release 15)", 3GPP TS 38.321, V15.8.0, Dec. 2019, pp. 1-78.
"Stage-2 Running CR for Support of UE Power Saving in Nr", 3GPP TSG-RAN WG2 Meeting #109, R2-20xxxxx, CATT, Feb. 14-28, 2020, 28 pages.
Office Action dated Dec. 2, 2022, issued in corresponding Indian Patent Application No. 202247055728.
Office action received for corresponding Japanese Patent Application No. 2022-553012, dated Oct. 31, 2023, 7 pages of office action and 6 pages of translation available.
"Power efficient adaptation of multi-carrier operation", 3GPP TSG-RAN WG2 #105-bis, R2-1904419, Agenda: 11.11.4.3, MediaTek Inc, Apr. 8-12, 2019, 5 pages.
"Remaining issues for SCell dormancy", 3GPP TSG-RAN WG1 #100-e, R1-2000982, Agenda :7.2.10.3, Qualcomm Incorporated, Feb. 24-Mar. 6, 2020, 10 pages.
Office Action received for corresponding Japanese Patent Application No. 2022-553012, dated Apr. 23, 2024, 4 pages of Office Action and 6 pages of translation available.

* cited by examiner

METHOD OF USER EQUIPMENT POWER SAVINGS USING GROUPS OF CELLS, AND NETWORK NODE THEREOF

RELATED APPLICATIONS

This application claims priority to U.S. Provisional Application No. 62/985,456, filed on Mar. 5, 2020, which is incorporated herein by reference in its entirety.

BACKGROUND

Field

One or more example embodiments relate to wireless communications networks.

Related Art

Fifth generation (5G) wireless communications networks are a next generation of mobile communications networks. Standards for 5G communications networks are currently being developed by the Third Generation Partnership Project (3GPP). These standards are known as 3GPP New Radio (NR) standards.

SUMMARY

At least one example embodiment is directed toward a method.

In one example embodiment, the method includes conducting, by at least one processor of a user equipment (UE), communications with a first group of cells; receiving, by at least one processor of a user equipment (UE), a first indicator, the first indicator notifying the UE to enable scheduling with at least one second group of cells; starting, by the at least one processor, a first inactivity timer associated with the at least one second group of cells based on the first indicator; and scheduling, by the at least one processor, communications with the at least one second group of cells following the starting of the first inactivity timer.

In one example embodiment, the first group of cells is a primary discontinuous reception (P-DRX) group of cells, and the at least one second group of cells is a secondary discontinuous reception (S-DRX) group of cells.

In one example embodiment, the P-DRX group of cells transmits using a lower frequency range relative to the S-DRX group of cells.

In one example embodiment, the first inactivity timer is a DRX-inactivity timer for a discontinuous reception (DRX) cycle of the S-DRX group of cells.

In one example embodiment, the S-DRX group includes a first physical downlink control channel (PDCCH) monitoring scheme with a first repeating discontinuous reception (DRX) cycle, the first repeating DRX cycle including a first uplink/downlink traffic period and a first OnDuration period, the P-DRX group includes a second physical downlink control channel (PDCCH) monitoring scheme with a second repeating discontinuous reception (DRX) cycle, the second repeating DRX cycle including a second uplink/downlink traffic period and a second OnDuration period, and the first downlink period and the first OnDuration period is shorter than the second downlink period and the second OnDuration period, respectively.

In one example embodiment, a first length of the first repeating DRX cycle is the same as a second length of the second repeating DRX cycle.

In one example embodiment, the scheduling of the communications includes, activating one or more cells of the at least one second group of cells.

In one example embodiment, the scheduling of communications includes, sending a command to one of more cells, of the at least one second group of cells, to cause the one or more cells to switch from dormant to non-dormant.

In one example embodiment, the method further includes receiving a second indicator, the second indicator indicating that the at least one second group of cells is dormant; and stopping the first inactivity timer and a DRX OnDuration timer, based on the receiving of the second indicator.

In one example embodiment, the method further includes receiving a second indicator, the second indicator indicating that the at least one second group of cells is dormant; and ensuring that a DRX OnDuration timer is not started, based on the receiving of the second indicator.

At least another example embodiment includes a network node.

In one example embodiment, the network node includes a memory containing computer-readable instructions; and at least one processor configured to read and execute the computer-readable instructions, in order to, conduct communications with a first group of cells, receive a first indicator, the first indicator notifying the network node to enable scheduling with at least one second group of cells, start a first inactivity timer associated with the at least one second group of cells based on the first indicator, and schedule communications with the at least one second group of cells following the starting of the first inactivity timer.

In one example embodiment, the first group of cells is a primary discontinuous reception (P-DRX) group of cells, and the at least one second group of cells is a secondary discontinuous reception (S-DRX) group of cells.

In one example embodiment, the P-DRX group of cells transmits using a lower frequency range relative to the S-DRX group of cells.

In one example embodiment, the first inactivity timer is a DRX-inactivity timer for a discontinuous reception (DRX) cycle of the S-DRX group of cells.

In one example embodiment, the S-DRX group includes a first physical downlink control channel (PDCCH) monitoring scheme with a first repeating discontinuous reception (DRX) cycle, the first repeating DRX cycle including a first uplink/downlink traffic period and a first OnDuration period, the P-DRX group includes a second physical downlink control channel (PDCCH) monitoring scheme with a second repeating discontinuous reception (DRX) cycle, the second repeating DRX cycle including a second uplink/downlink traffic period and a second OnDuration period, and the first downlink period and the first OnDuration period is shorter than the second downlink period and the second OnDuration period, respectively.

In one example embodiment, a first length of the first repeating DRX cycle is the same as a second length of the second repeating DRX cycle.

In one example embodiment, the at least one processor is further configured to schedule the communications by, activating one or more cells of the at least one second group of cells.

In one example embodiment, the at least one processor is further configured to schedule the communications by, sending a command to one of more cells, of the at least one second group of cells, to cause the one or more cells to switch from dormant to non-dormant.

In one example embodiment, the at least one processor is further configured to: receive a second indicator, the second indicator indicating that the at least one second group of cells is dormant, and stop the first inactivity timer and a DRX OnDuration timer, based on the receiving of the second indicator.

In one example embodiment, the at least one processor is further configured to: receive a second indicator, the second indicator indicating that the at least one second group of cells is dormant, and ensure that a DRX OnDuration timer is not started, based on the receiving of the second indicator.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of this disclosure.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. The example embodiments may, however, be embodied in many alternate forms and should not be construed as limited to only the embodiments set forth herein.

It should be understood that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

While one or more example embodiments may be described from the perspective of radio network elements (e.g., gNB), user equipment, or the like, it should be understood that one or more example embodiments discussed herein may be performed by the one or more processors (or processing circuitry) at the applicable device. For example, according to one or more example embodiments, at least one memory may include or store computer program code, and the at least one memory and the computer program code may be configured to, with at least one processor, cause a radio network element (or user equipment) to perform the operations discussed herein.

It will be appreciated that a number of example embodiments may be used in combination.

Figure 1:
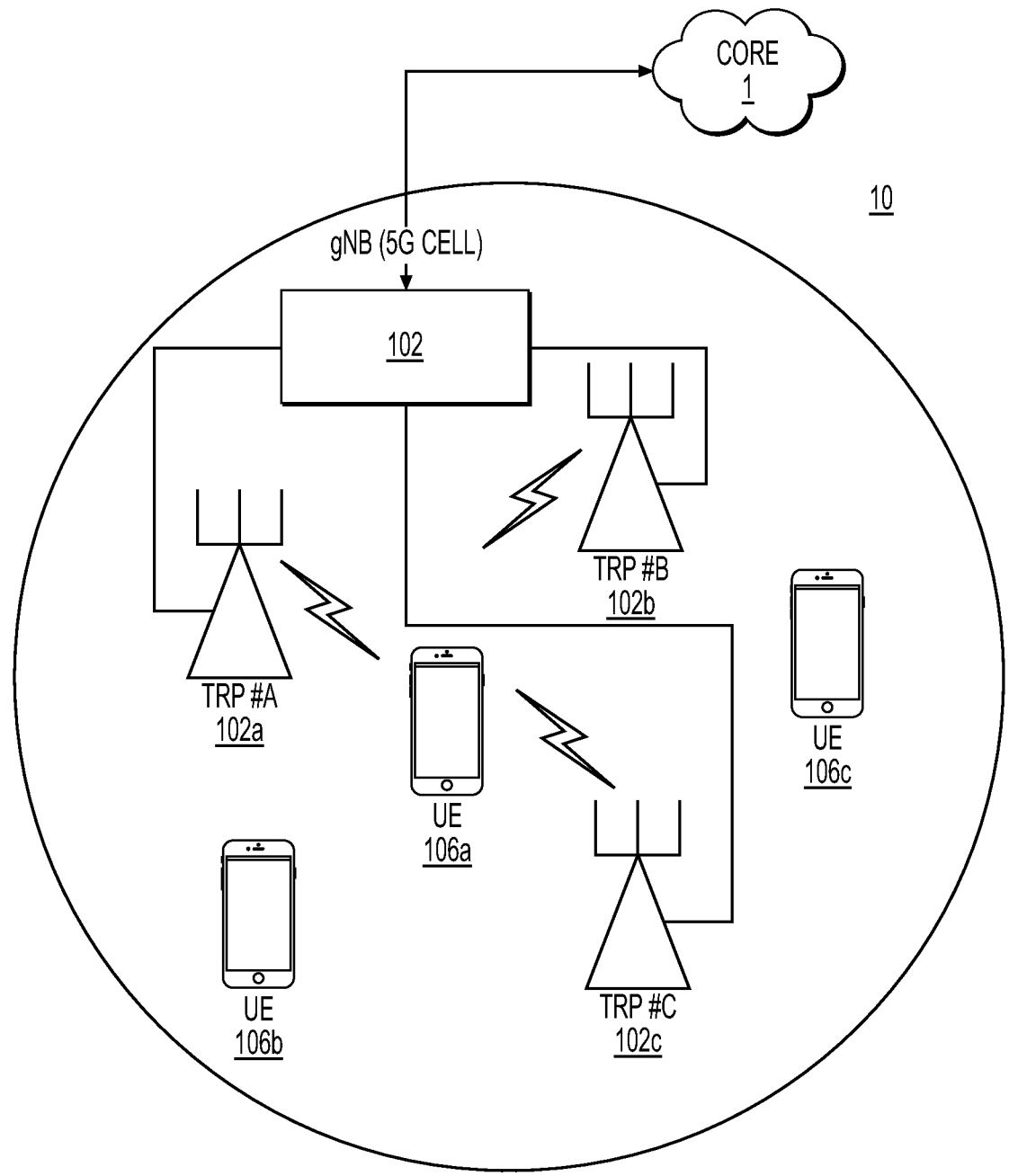
FIG. 1 illustrates a simplified diagram of a portion of a 3rd Generation Partnership Project (3GPP) New Radio (NR) access deployment for explaining example embodiments.

FIG. 1 illustrates a simplified diagram of a portion of a $3^{rd}$ Generation Partnership Project (3GPP) New Radio (NR) access network 10 for explaining example embodiments. The 3GPP NR radio access deployment includes a base station (e.g., gNB 102) having transmission and reception points (TRPs) 102a, 102b, 102c. Each TRP 102a, 102b, 102c may be, for example, a remote radio head (RRH) or remote radio unit (RRU) including at least, for example, a radio frequency (RF) antenna (or antennas) or antenna panels, and a radio transceiver, for transmitting and receiving data within a geographical area. In an example embodiment, the TRP 102a, 102b, 102c can be considered secondary cells (SCells), from the standpoint the TRP 102a, 102b, 102c are smaller cells that communicate in conjunction with a larger cell (e.g., gNB 102). The TRPs 102a, 102b, 102c provide cellular resources for user equipment (UEs) 106a, 106b, 106c within a geographical coverage area. In some cases, baseband processing may be divided between the TRPs 102a, 102b, 102c and gNB 102 in a 5th Generation (5G) cell. Alternatively, the baseband processing may be performed at the gNB 102. In the example shown in FIG. 1, the TRPs 102a, 102b, 102c are configured to communicate with the UEs (e.g., UE 106a) via one or more transmit (TX)/receive (RX) beam pairs. The gNB 102 communicates with the network core 1, which is referred to as the New Core in 3GPP NR.

The TRPs 102a, 102b, 102c may have independent schedulers, or the gNB 102 may perform joint scheduling among the TRPs 102a, 102b, 102c.

It should be understood that the gNB 102 and TRPs 102a, 102b, 102c can provide communication services to a relatively large number of UEs 106a, 106b, 106c within the coverage area of the TRPs 102a, 102b, 102c. For the sake of clarity of example embodiments, communication services (including transmitting and receiving wireless signals) will be discussed primarily between the gNB 102, TRP 102a and/or the UE 106a, though it should be understood that signals may be transmitted between the gNB 102, any of the TRPs 102a, 102b, 102c, and any of the UEs 106a, 106b, 106c.

Figure 2:
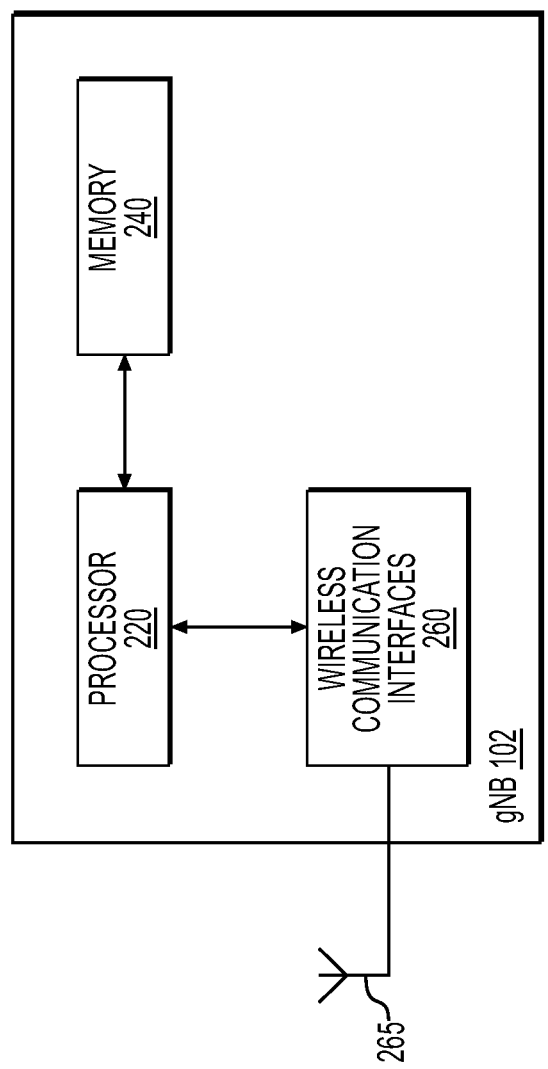
FIG. 2 illustrates a block diagram of a gNB, in accordance with an example embodiment.

FIG. 2 illustrates a block diagram of a gNB 102 (shown in FIG. 1), in accordance with an example embodiment. As shown, the gNB 102 includes: a memory 240; a processor 220 connected to the memory 240; various interfaces 260 connected to the processor 220; and one or more antennas or antenna panels 265 connected to the various interfaces 260. The various interfaces 260 and the antenna 265 may constitute a transceiver for transmitting/receiving data from/to the gNB 102 via a plurality of wireless beams or from/to the plurality of TRPs 102a, 102b, 102c, etc. As will be appreciated, depending on the implementation of the gNB 102, the gNB 102 may include many more components than those shown in FIG. 2. However, it is not necessary that all of these components be shown in order to disclose the illustrative example embodiment.

The memory 240 may be a computer readable storage medium that generally includes a random access memory (RAM), read only memory (ROM), and/or a permanent mass storage device, such as a disk drive. The memory 240 also stores an operating system and any other routines/modules/applications for providing the functionalities of the gNB 102 (e.g., functionalities of a gNB, methods according to the example embodiments, etc.) to be executed by the processor 220. These software components may also be loaded from a separate computer readable storage medium into the memory 240 using a drive mechanism (not shown). Such separate computer readable storage medium may include a disc, tape, DVD/CD-ROM drive, memory card, or other like computer readable storage medium (not shown). In some example embodiments, software components may be loaded into the memory 240 via one of the various interfaces 260, rather than via a computer readable storage medium.

The processor 220 may be configured to carry out instructions of a computer program by performing the arithmetical, logical, and input/output operations of the system. Instructions may be provided to the processor 220 by the memory 240.

The various interfaces 260 may include components that interface the processor 220 with the antenna 265, or other input/output components. As will be understood, the various interfaces 260 and programs stored in the memory 240 to set forth the special purpose functionalities of the gNB 102 will vary depending on the implementation of the gNB 102.

The interfaces 260 may also include one or more user input devices (e.g., a keyboard, a keypad, a mouse, or the like) and user output devices (e.g., a display, a speaker, or the like).

Although not specifically discussed herein, the configuration shown in FIG. 2 may be utilized to implement, inter alia, the TRPs 102a, 102b, 102c, other radio access and backhaul network elements and/or devices. In this regard, for example, the memory 240 may store an operating system and any other routines/modules/applications for providing the functionalities of the TRPs, etc. (e.g., functionalities of these elements, methods according to the example embodiments, etc.) to be executed by the processor 220.

Figure 3:
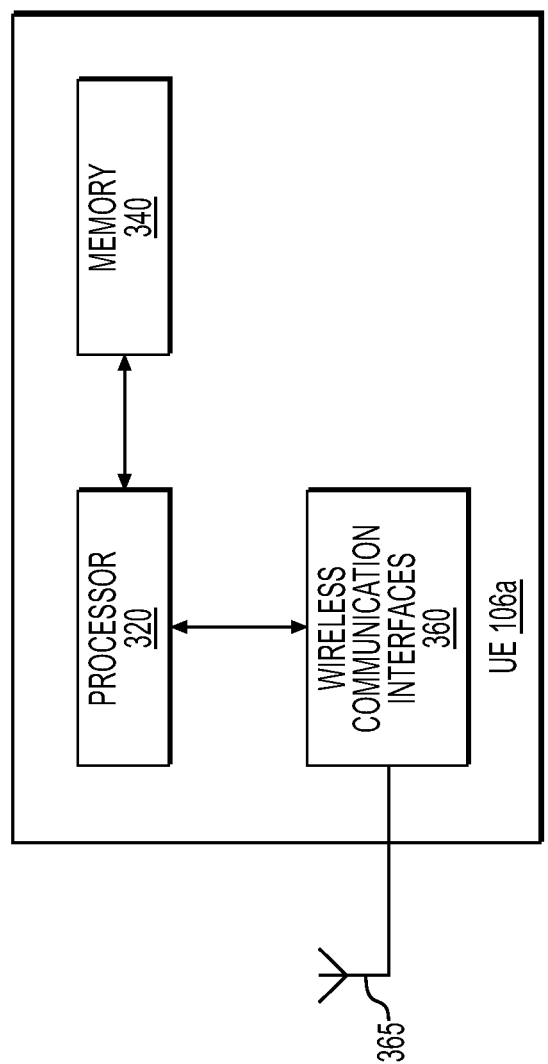
FIG. 3 illustrates a block diagram of a user equipment (UE), in accordance with an example embodiment.

FIG. 3 illustrates a block diagram of the user equipment (UE) 106a, in accordance with an example embodiment. It should be understood that the other UEs 106b, 106c have the same structure. The UE 106a is a device used by an end-user to communicate via the 3GPP NR radio access deployment shown in FIG. 1. Examples of UEs include cellular phones, smartphones, tablet, computers, laptop computers, or the like.

As shown, the UE 106a includes: a memory 340; a processor 320 connected to the memory 340; various interfaces 360 connected to the processor 320; and one or more antennas or antenna panels 365 connected to the various interfaces 360. The various interfaces 360 and the antenna 365 may constitute a transceiver for transmitting/receiving data to/from the gNB 102 via a plurality of wireless beams or to/from the plurality of TRPs 102a, 102b, 102c, etc. As will be appreciated, depending on the implementation of the UE 106a, the UE 106a may include many more components than those shown in FIG. 3. However, it is not necessary that all of these generally conventional components be shown in order to disclose the illustrative example embodiment.

The memory 340 may be a computer readable storage medium that generally includes a random access memory (RAM), read only memory (ROM), and/or a permanent mass storage device, such as a disk drive. The memory 340 also stores an operating system and any other routines/modules/applications for providing the functionalities of the UE 106a (e.g., functionalities of a UE, methods according to the example embodiments, etc.) to be executed by the processor 320. These software components may also be loaded from a separate computer readable storage medium into the memory 340 using a drive mechanism (not shown). Such separate computer readable storage medium may include a disc, tape, DVD/CD-ROM drive, memory card, or other like computer readable storage medium (not shown). In some example embodiments, software components may be loaded into the memory 340 via one of the various interfaces 360, rather than via a computer readable storage medium.

The processor 320 may be configured to carry out instructions of a computer program by performing the arithmetical, logical, and input/output operations of the system. Instructions may be provided to the processor 320 by the memory 340.

The various interfaces 360 may include components that interface the processor 320 with the antenna 365, or other input/output components. As will be understood, the various interfaces 360 and programs stored in the memory 340 to set forth the special purpose functionalities of the UE 106a will vary depending on the implementation of the UE 106a.

The interfaces 360 may also include one or more user input devices (e.g., a keyboard, a keypad, a mouse, or the like) and user output devices (e.g., a display, a speaker, or the like).

General Concepts:

In an example embodiment, a wake-up signal (WUS) allows the UE 106a to skip physical downlink control channel (PDCCH) monitoring for a planned monitoring time period (an 'OnDuration' time period), when there is no data transmission to be transmitted. If the core 1 of the network (NW) 10 intends to schedule the UE 106a, the core 1 needs to send wake-up signaling (WUS) to the UE 106a during a WUS occasion(s), to start the drx-onDurationTimer for the UE 106a. Once notified of the WUS occasion, via the WUS, the UE 106a will monitor a normal PDCCH for scheduling data during the coming OnDuration.

In 3GPP, the WUS is an indicator called (DCP) downlink control information (DCI) with cyclic redundancy check (CRC) scrambled by power saving radio network temporary identity (PS-RNTI). In an alternative expression, the WUS or DCP may be referred as physical downlink control channel (PDCCH) transmission carrying a wake-up indication. This wake-up indication may include indication for UE to determine whether to start (or not to start) drx-onDurationTimer on the next occurrence of the timer and it may additionally include indication regarding SCell(s) and/or SCell group(s) dormancy state.

When DRX is configured, the terminal device does not have to continuously monitor PDCCH. DRX is characterized by the following:
- on-duration: duration that the UE waits for, after waking up, to receive PDCCHs. If the UE successfully decodes a PDCCH, the UE stays awake and starts the inactivity timer;
- inactivity-timer: duration that the UE waits to successfully decode a PDCCH, from the last successful decoding of a PDCCH, failing which it can go back to sleep. The UE shall restart the inactivity timer following a single successful decoding of a PDCCH for a first transmission only (i.e., not for retransmissions);
- retransmission-timer: duration until a retransmission can be expected;
- cycle: specifies the periodic repetition of the on-duration followed by a possible period of inactivity;

active-time: total duration that the UE monitors PDCCH. This includes the "on-duration" of the DRX cycle, the time UE is performing continuous reception while the inactivity timer has not expired, and the time when the UE is performing continuous reception while waiting for a retransmission opportunity.

In addition, the UE may be indicated, when configured accordingly, whether it is required to monitor or not the PDCCH during the next occurrence of the on-duration by a DCP received on the active BWP. By default, if it does not detect a DCP on the active BWP, the UE does not monitor the PDCCH during the next occurrence of the on-duration. However, it can also be configured to have the opposite behavior in this case, i.e., monitor the PDCCH during the next occurrence of the on-duration.

A UE can only be configured to monitor DCP when connected mode DRX is configured, and at occasion(s) at a configured offset before the on-duration. More than one monitoring occasion can be configured before the on-duration. The UE does not monitor DCP on occasions occurring during active-time, measurement gaps, or BWP switching, in which case it monitors the PDCCH during the next on-duration. If no DCP is configured in the active BWP, UE follows normal DRX operation.

Figure 4:
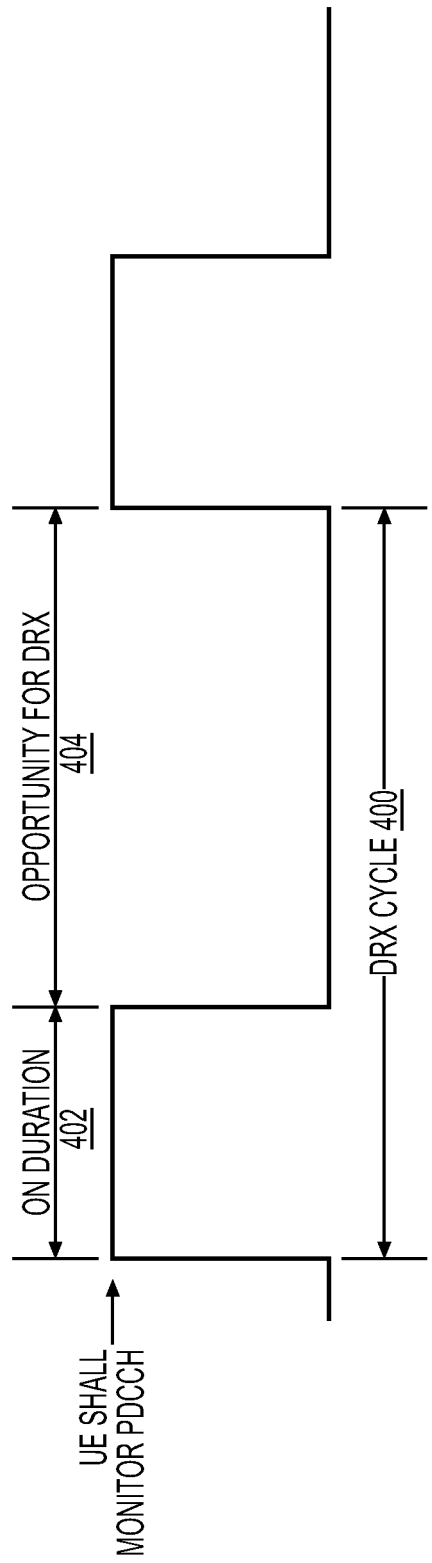
FIG. 4 illustrates a discontinuous reception (DRX) cycle for the UE, in an example embodiment.

Discontinuous Reception (DRX) Cycle:

FIG. 4 illustrates a discontinuous reception (DRX) cycle 400 for the UE 106a, in an example embodiment. The PDCCH monitoring occurs during these DRX cycles 400. Specifically, the PDCCH monitoring activity for the UE 106a a radio resource control (RRC) connected mode is governed by the DRX cycle 400, bandwidth adaptation (BA), and DCP.

In an example embodiment, when DRX cycle 400 is configured, the UE 106a does not have to continuously monitor PDCCH, and for this reason the UE 106a can save power consumption. The DRX cycle 400 is characterized by several elements, including: an on-duration time 402, an inactivity-timer, a retransmission-timer, and an active-time. The on-duration time 402 is a duration that the UE 106a waits for, after waking up, to receive PDCCHs for the UE 106a. If the UE 106a successfully decodes a PDCCH, the UE 106a stays awake and starts the inactivity-timer. In an example embodiment, the inactivity-timer is a timer that governs a duration in which the UE 106a waits to successfully decode a PDCCH, from the last successful decoding of a PDCCH, failing which the UE 106a will go back to sleep. The UE 106a shall restart the inactivity-timer following a single successful decoding of a PDCCH for a first transmission only (i.e., not for retransmissions). The retransmission-timer is a timer that governs a duration until a retransmission can be expected. The active-time is a time that governs a total duration that the UE 106a monitors PDCCH. This includes the "on-duration" 402 of the DRX cycle 400, the time the UE 106a is performing continuous reception while the inactivity-timer has not expired, and the time when the UE 106a is performing continuous reception while waiting for a retransmission opportunity. The DRX cycle 400 is the periodic repetition of the on-duration 402 followed by a possible period of inactivity 404.

In an example embodiment, the BA is configured so that the UE 106a only has to monitor PDCCH on one active bandwidth part (BWP). That is to say, the UE 106a does not have to monitor PDCCH on the entire downlink (DL) frequency of a cell. In an example embodiment, a BWP inactivity timer (independent from the DRX inactivity-timer described above) is used to switch the active BWP to the default one: the timer is restarted upon successful PDCCH decoding and the switch to the default BWP takes place when it expires. In 5G, a BWP is a contiguous set of physical resource blocks (PRBs) on a given carrier.

In an example embodiment, the UE 106a is notified to monitor, or not monitor, the PDCCH during a next occurrence of the on-duration 402 by a DCP received on an active BWP. In an example embodiment, by default if the UE 106a does not detect a DCP on the active BWP, the UE 106a does not monitor the PDCCH during the next occurrence of the on-duration 402. However, in an example embodiment, the UE 106a can alternatively be configured to monitor the PDCCH during the next occurrence of the on-duration.

In an example embodiment, the UE 106a is configured to monitor DCP only when a connected mode DRX is configured, and at occasion(s) during a configured offset before the on-duration 402. In an example embodiment, more than one monitoring occasion can be configured before the on-duration. In an example embodiment, the UE 106a does not monitor DCP on occasions occurring during the active-time, measurement gaps, or BWP switching, in which case the UE 106a monitors the PDCCH during the next on-duration. It should be understood that the DCP is the wake-up indication that either starts, or does not start, the DRX "on Duration" timer in the UE 106a. In an example embodiment, if no DCP is configured in the active BWP, the UE 106a follows normal DRX operation.

In an example embodiment, when carrier aggregation (CA) is configured, DCP is only configured on the SpCell, where the SpCell refers to the Primary Cell (PCell) of the Master Cell Group (MCG) or the Primary Secondary Cell (PSCell) of the Secondary Cell Group (SCG).

In an example embodiment, one DCP is configured to control PDCCH monitoring during on-duration 402 for one or more UEs 106, independently.

In an example embodiment, power saving in a radio resource control idle mode (RRC_IDLE) and a radio resource control inactive mode (RRC_INACTIVE) can be achieved by the UE 106a relaxing neighbor cell radio resource measurements (RRM) when the UE 106a determines it is in a low mobility scenario, or the UE 106a is not at the cell edge. In an example embodiment, DCP can be configured in RRC_INACTIVE or RRC_IDLE mode.

In an example embodiment, the UE 106a power saving is enabled by adapting the DL maximum number of multiple input multiple output (MIMO) layers by BWP switching.

In an example embodiment, power saving is enabled during active-time via cross-slot scheduling, which facilitates the UE 106a to achieve power saving with the assumption that the UE 106a will not be scheduled to receive physical downlink shared channel (PDSCH), triggered to receive channel state information (A-CSI) or transmit a physical uplink control channel (PUSCH) scheduled by the PDCCH until a minimum scheduling offsets K0 and K2. In an example embodiment, dynamic adaptation of the minimum scheduling offsets K0 and K2 is controlled by PDCCH.

Dormant BWP for SCell:

In an example embodiment, "dormant" behavior involves multiple BWPs. In an example embodiment, for instance, dormant behavior includes at most one BWP that is a dormant BWP, and one BWP that is a non-dormant BWP (or a first BWP after dormancy or a BWP where UE switches from dormant BWP), or alternatively one BWP that is a dormant BWP and other BWPs that are regular BWPs. A dormant BWP is a BWP without PDCCH monitoring that has limited or no UL operation. In an example embodiment, the network core 1 can switch between dormant and non-dormant BWPs, using a "one-bit indication" (one-bit identifier, or indicator) or similar which can be transmitted during an active time, or outside of an active time (with slightly different signaling). In other words, in an example embodiment, when the network core 1 notifies the UE 106a to switch from dormant BWP to non-dormant BWP, by sending an indicator to the UE 106a, via the processor 220 of the gNB 102 sending the indicator to the UE 106a, the UE 106a switches to a first non-dormant BWP ID (for PDCCH monitoring) from a dormant BWP. The first non-dormant BWP ID can be different during an active time, as compared to during an active time.

Monitoring Dormancy/Non-Dormancy:

In an example embodiment, PDCCH monitoring and dormancy/non-dormancy behavior for SCells includes the following:

The UE 106a is configured with DRX mode operation, via the PCell, or via the SCell.

A location in the DCI format 2_6 of a wake-up indication bit is in the PSPositionDCI2-6, where:
  the UE 106a does not start the drx-onDurationTimer for the next long DRX cycle 400 when a value of the 'PDCCH monitoring' bit is '0', and
  the UE 106a starts the drx-onDurationTimer for a next long DRX cycle 400 when a value of the 'PDCCH monitoring' bit is '1.'

In an example embodiment, a bitmap when the UE 106a is provided a number of groups of configured SCells, by SCell-groups-for-dormancy-outside-active-time, occurs when:
  the bitmap location is immediately after the 'PDCCH monitoring' bit location
  the bitmap size is equal to the number of groups of configured SCells where each bit of the bitmap corresponds to a group of configured SCells from the number of groups of configured SCells
  a '0' value for a bit of the bitmap indicates an active DL BWP, provided by dormant-BWP, for the UE 106a for each activated SCell in the corresponding group of configured SCells, and
  a '1' value for a bit of the bitmap indicates an active DL BWP, provided by first-non-dormant-BWP-ID-for-DCI-outside-active-time, for the UE 106a for each activated SCell in the corresponding group of configured SCells.

The DCP is the wake-up indication either starting or not starting the drx-onDurationTimer in the UE 106a, and the bitmap is the indication regarding dormancy state of group of configured SCells 102a, 102b, 102c upon start of the drx-onDurationTimer. The bitmap indication regarding the dormancy state may be configurable and may be configured when UE is configured with SCell dormancy.

In an example embodiment, the UE 106a can be configured for up to five groups of configured SCells 102a, 102b, 102c for dedicated dormancy behavior—where each group can consist of number of SCells (one or more). In one example, the UE 106a can also be configured with more than five groups.

Figure 5:
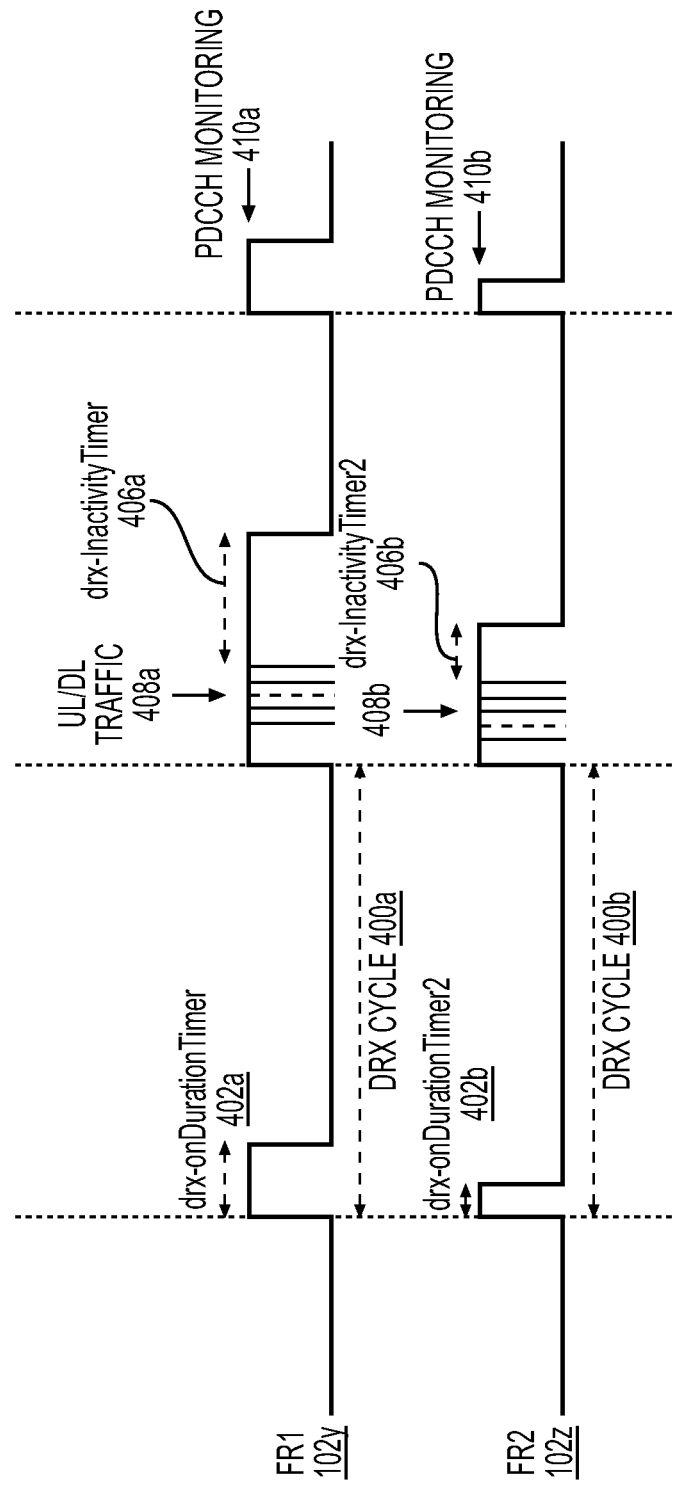
FIG. 5 illustrates a configuration involving multiple DRX groups, in accordance with an example embodiment.

Multiple DRX Groups:

FIG. 5 illustrates a configuration involving multiple DRX groups, in accordance with an example embodiment. In an example embodiment, this configuration can include a first group of a PCell and zero or more SCells 102y, and a second group of one or more SCells 102z. In an example embodiment, the PCell and possibly SCells 102y transmit using a first frequency range FR1, and the SCells 102z transmit using a second frequency range FR2. In an example embodiment, the first frequency range FR1 uses a lower frequency range as compared to the second frequency range FR2. In an example embodiment, the PCell may also be associated with the second group 102z.

In an example embodiment, both FR1 and FR2 cells are configured via Carrier Aggregation. In an example embodiment, the FR2 cells can be configured with a separate (and shorter) drx-InactivityTimer (406b) and drx-OnDuration-Timer (402b), as compared to the drx-InactivityTimer (406a) and drx-OnDurationTimer (402a) of the FR1 cells. The length of Long DRX cycle 400a/b and Short DRX cycle, if configured, are common for both FR1 and FR2. In an example embodiment, the FR2 cells to go to sleep more quickly and thereby reduce power consumption as compared to the FR1 cells. In an example embodiment, the first group of PCell and zero of more SCells may be referred to as primary DRX group and the second group of one or more SCells may be referred to as secondary DRX group.

In an example embodiment, a separate drx-Inactivity-Timer (406b) and drx-onDurationTimer (402b) can be configured for the secondary DRX group (FR2 cells). In an example embodiment, a combination of cross-carrier scheduling and secondary DRX group 102z is not supported.

In an example embodiment, timers (406b/402b) for FR2 DRX configuration are shorter than timers (406a/402a) for FR1 DRX configuration. In an example embodiment, the secondary DRX configuration can be applied to the FR2 cells and the existing DRX configuration for the FR1 cells. In an example embodiment, the secondary DRX configuration can be applied to the FR1 cells and the existing DRX configuration for the FR2 cells. It should be noted that the DRX groups can be formed from the configured PCell and one or more SCells also by other means without taking the frequency ranges into account.

Technical Problem Solved by Some Example Embodiments

In an example embodiment, the second group of one or more SCells 102z is a secondary DRX (S-DRX) group, and the first group of a PCell and zero or more SCells 102y is a primary DRX (P-DRX) group. In an example embodiment, the S-DRX group configuration operates with the shorter drx-InactivityTimer 406b and the drx-onDurationTimer 402b values, compared to the primary DRX (P-DRX) group configuration, the S-DRX group may sleep before the P-DRX group. In an example embodiment, as the cross-carrier scheduling over the DRX groups may not be supported, the NW 10 is not able to re-start the drx-Inactivity-Timer 406b for the S-DRX group, e.g., when DL data becomes suddenly available for transmission after expiration of the drx-InactivityTimer 406b. In an example embodiment, this will enforce the data to be transmitted over the P-DRX group cells 102z until either the data is completely transmitted or a next drx-onDurationTimer occasion becomes available so that cells in S-DRX group can be scheduled.

Overview of Some Example Embodiments

In some example embodiments, when the network 10 indicates via the primary DRX group 102y that at least one SCell group 102z should switch from dormant BWP to non-dormant BWP, the processor 320 of the UE 106a starts/restarts the drx-Inactivity Timer 406b associated with the secondary DRX group 102z. In an example embodiment, this is accomplished to enable scheduling with the S-DRX group 102z, in the event the UE 106a is no longer in active time, or in the event the UE 106a will enter into DRX during the BWP switching period in the S-DRX group.

In some embodiments, the drx-InactivityTimer 406b associated with S-DRX group 102z is started/restarted, by the processor 320 of the UE 106a, only in case one or more SCells 102z associated with the S-DRX group are switched from dormant BWP to non-dormant BWP.

In some example embodiments, the NW 10 can trigger a start/restart of the drx-InactivityTimer 406b associated with S-DRX group also by a SCell group 102z already operating on non-dormant BWP (or any other BWP that is not dormant BWP), by indicating (notifying) the SCell group 102z to move to a non-dormant BWP. In some example embodiments, the processor 320 of the UE 106a, in this case, either switches the BWP of each associated SCell 102z to a non-dormant BWP or retains the current BWP active in each associated SCell 102z.

In some example embodiments, when the network 10 indicates (notifies) all the SCell group(s) 102z associated with the S-DRX group to switch from BWP (non-dormant, regular, etc.) to dormant BWP, the processor 320 of the UE 106a stops drx-on DurationTimer 402b and drx-inactivityTimer 406b associated with S-DRX group.

In some example embodiments, if a WUS indicates (notifies) all the SCell groups 102z associated with the S-DRX group to remain/switch to dormant BWP, the processor 320 of the UE 106a does not start the drx-onDurationTimer 402b associated with the S-DRX group at the next drx-onDurationTimer 406b occasion.

In some example embodiments, if the WUS is missed, by the UE 106a, due to being in active time with the P-DRX group 102y, and all the SCell groups 102z associated with S-DRX group were configured in dormant BWP, the processor 320 of the UE 106a does not start the drx-onDurationTimer 402b for the S-DRX group at the next occasion. Alternatively, the processor 320 of the UE 106a starts the drx-onDurationTimer 402b and switches SCell(s)/SCell group(s) 102z to non-dormant BWP, for instance, according to methods proposed in app. No. 62/975,356, "Method for Enabling Secondary Cell Dormancy for User Equipment Power Savings," filed Feb. 12, 2020.

In some example embodiments, all the SCell(s)/SCell groups 102z associated with the S-DRX group are implicitly assumed to be dormant state after the drx-InactivityTimer 406b associated with the S-DRX group expires. In an example embodiment, the drx-InactivityTimer 406a can also be associated with the primary DRX group 102y.

In some example embodiments, when an SCell 102z belonging to the S-DRX group is configured but not activated, and the SCell 102z becomes activated by the network indicator (DCI command, MAC activation/deactivation command, etc.) via a cell in primary DRX group (or activated implicitly based on some timer), the drx-InactivityTimer 406b of secondary DRX group is started.

In some example embodiments, when all the SCells 102z belonging to the S-DRX group are deactivated (by means of explicit indication by the NW 10 or by SCell deactivation timer), the processor 320 of the UE 106a stops the drx-onDurationTimer 402b and drx-inactivityTimer 406b associated with S-DRX group.

In some example embodiments, the NW 10 can configure the UE 106a (by sending instructions to the processor 320 to be stored in the memory 340) upon various options as presented above.

In an example embodiment, the S-DRX group 102z can be activated (at least one of the drx-onDurationTimer 402b and drx-inactivityTimer 406b associated with S-DRX group started) by the NW 10, using existing signaling, upon data activity when the S-DRX group 102z has already switched to DRX, during times when the P-DRX group 102y has not switched to DRX.

In an example embodiment, additional power savings can be realized, in the event the SCells 102z associated with the S-DRX group are capable of being dormant during periods of time.

Figure 6:
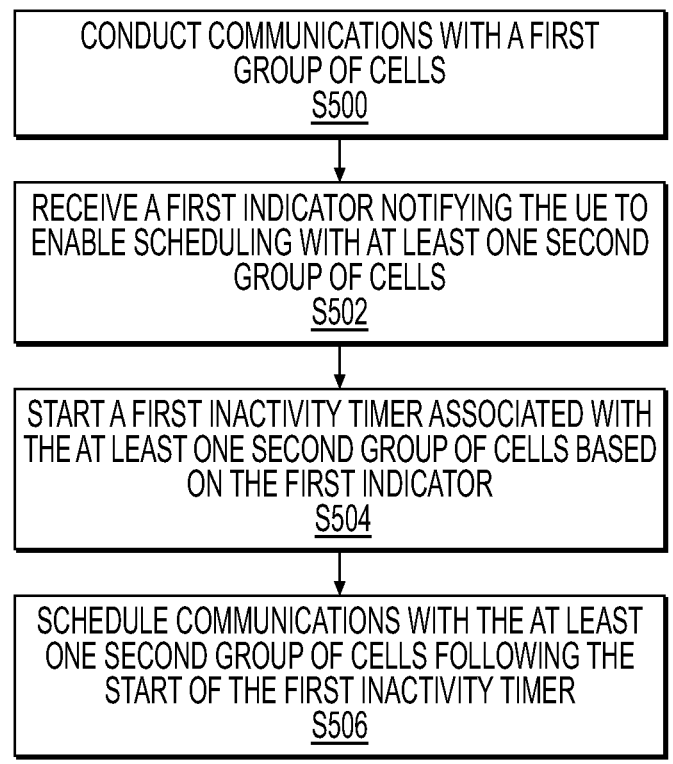
FIG. 6 illustrates a method of power saving for the UE, using multiple DRX groups, in an example embodiment.

Example Method According to Some Example Embodiments:

FIG. 6 illustrates a method of power saving for the UE, using multiple DRX groups, in an example embodiment. It should be understood that these steps are performed by the processor 320 of the UE 106a.

In an embodiment, and as shown in step S500, the processor 320 of the UE 106a conducts communications with a first group of cells. In an example embodiment, the first group of cells is the PCell and zero or more SCells 102y of FIG. 5.

In an embodiment, and as shown in step S502, the processor 320 of the UE 106a receives a first indicator, the first indicator notifying the UE to enable scheduling with at least one second group of cells. In an example embodiment, the at least one second group of cells is the SCells 102z of FIG. 5.

In an embodiment, and as shown in step S504, the processor 320 of the UE 106a starts a first inactivity timer 406b associated with the at least one second group of cells 102z based on the first indicator (see FIG. 5).

In an embodiment, and as shown in step S506, the processor 320 of the UE 106a schedules communications with the at least one second group of cells 102z following the starting of the first inactivity timer 406b.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

As discussed herein, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at, for example, existing user equipment, base stations, an as Evolved Node B (eNBs), a remote radio head (RRH), a 5G base station (gNBs), femto base stations, network controllers, computers, or the like. Such existing hardware may be processing or control circuitry such as, but not limited to, one or more processors, one or more Central Processing Units (CPUs), one or more controllers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUS), one or more microprocessors, one or more Application Specific Integrated Circuits (ASICs), or any other device or devices capable of responding to and executing instructions in a defined manner.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium," "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine-readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks. For example, as mentioned above, according to one or more example embodiments, at least one memory may include or store computer program code, and the at least one memory and the computer program code may be configured to, with at least one processor, cause a network element or network device to perform the necessary tasks. Additionally, the processor, memory and example algorithms, encoded as computer program code, serve as means for providing or causing performance of operations discussed herein.

A code segment of computer program code may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable technique including memory sharing, message passing, token passing, network transmission, etc.

The terms "including" and/or "having," as used herein, are defined as comprising (i.e., open language). The term "coupled," as used herein, is defined as connected, although not necessarily directly, and not necessarily mechanically. Terminology derived from the word "indicating" (e.g., "indicates" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/information being indicated, and the conveyance of some symbol representing the object/information being indicated.

According to example embodiments, user equipment, base stations, eNBs, RRHs, gNBs, femto base stations, network controllers, computers, or the like, may be (or include) hardware, firmware, hardware executing software or any combination thereof. Such hardware may include processing or control circuitry such as, but not limited to, one or more processors, one or more CPUs, one or more controllers, one or more ALUs, one or more DSPs, one or more microcomputers, one or more FPGAs, one or more SoCs, one or more PLUs, one or more microprocessors, one or more ASICs, or any other device or devices capable of responding to and executing instructions in a defined manner.

Benefits, other advantages, and solutions to problems have been described above with regard to specific embodiments of the present disclosure. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

What is claimed is:

1. A method, comprising:
   conducting, by at least one processor of a user equipment (UE), communications with a first group of cells;

receiving, by the at least one processor, a first indicator, the first indicator notifying the UE to enable scheduling with at least one second group of cells;

starting, by the at least one processor, a first inactivity timer associated with the at least one second group of cells based on the first indicator, the first inactivity timer being a shorter duration than a second inactivity timer associated with the at least one group of cells; and scheduling, by the at least one processor, communications with the at least one second group of cells following the starting of the first inactivity timer, wherein the first group of cells is a primary discontinuous reception (P-DRX) group of cells, and the at least one second group of cells is a secondary discontinuous reception (S-DRX) group of cells, wherein the scheduling of communications includes, sending a command to one of more cells, of the at least one second group of cells, to cause the one or more cells to switch from dormant to non-dormant, the method further comprising:

configuring the UE with DRX mode operation, via the primary group of cells or the secondary group of cells;

setting a location in a DCI format of a wake-up indication bit in a first position, where:

the UE a does not start a DRXOnDuration timer for a next long DRX cycle when a value of a 'physical downlink control channel (PDCCH) monitoring' bit is '0', and the UE a starts the DRXOnDuration for a next long DRX cycle when a value of the 'PDCCH monitoring' bit is '1'.

2. The method of claim 1, wherein a bitmap when the UE is provided a number of groups of configured secondary cells by secondary cell-groups-for-dormancy-outside-active-time occurs when:

a bitmap location is immediately after the 'PDCCH monitoring' bit location, the bitmap size is equal to the number of groups of configured secondary cells where each bit of the bitmap corresponds to a group of configured secondary cells from the number of groups of configured secondary cells, a '0' value for a bit of the bitmap indicates an active downlink bandwidth part (BWP), provided by a dormant BWP, for the UE for each activated secondary cell in the corresponding group of configured secondary cells, and a '1' value for a bit of the bitmap indicates an active downlink BWP, provided by first-non-dormant-BWP-ID-for-DCI-outside-active-time, for the UE for each activated secondary cell in the corresponding group of configured secondary cells.

3. The method of claim 2, wherein the P-DRX group of cells transmits using a lower frequency range relative to the S-DRX group of cells.

4. The method of claim 2, wherein the S-DRX group includes a first physical downlink control channel (PDCCH) monitoring scheme with a first repeating discontinuous reception (DRX) cycle, the first repeating DRX cycle including a first uplink/downlink traffic period and a first OnDuration period, the P-DRX group includes a second physical downlink control channel (PDCCH) monitoring scheme with a second repeating discontinuous reception (DRX) cycle, the second repeating DRX cycle including a second uplink/downlink traffic period and a second OnDuration period, and the first downlink period and the first OnDuration period is shorter than the second downlink period and the second OnDuration period, respectively.

5. The method of claim 4, wherein a first length of the first repeating DRX cycle is the same as a second length of the second repeating DRX cycle.

6. The method of claim 2, wherein the scheduling of the communications includes, activating one or more cells of the at least one second group of cells.

7. The method of claim 2, wherein the scheduling of communications includes, sending a command to one of more cells, of the at least one second group of cells, to cause the one or more cells to switch from dormant to non-dormant.

8. The method of claim 1, wherein the first inactivity timer is a DRX-inactivity timer for a discontinuous reception (DRX) cycle of the S-DRX group of cells.

9. The method of claim 8, further comprising:

receiving a second indicator, the second indicator indicating that the at least one second group of cells is dormant; and stopping the first inactivity timer and a DRX OnDuration timer, based on the receiving of the second indicator.

10. The method of claim 8, further comprising:

receiving a second indicator, the second indicator indicating that the at least one second group of cells is dormant; and ensuring that a DRX OnDuration timer is not started, based on the receiving of the second indicator.

11. The method of claim 1, wherein the first group of cells transmits at a lower frequency range relative to the at least one second group of cells.

12. A user equipment, comprising:

a memory containing computer-readable instructions; and at least one processor configured to read and execute the computer-readable instructions, in order to, conduct communications with a first group of cells, receive a first indicator, the first indicator notifying the network node to enable scheduling with at least one second group of cells, start a first inactivity timer associated with the at least one second group of cells based on the first indicator, the first inactivity timer being a shorter duration than a second inactivity timer associated with the at least one group of cells, and schedule communications with the at least one second group of cells following the starting of the first inactivity timer, wherein the first group of cells is a primary discontinuous reception (P-DRX) group of cells, and the at least one second group of cells is a secondary discontinuous reception (S-DRX) group of cells, wherein the scheduling of communications includes, sending a command to one of more cells, of the at least one second group of cells to cause the one or more cells to switch from dormant to non-dormant, the at least one processor further configured to read and execute the computer-readable instructions, in order to:

configure the UE with DRX mode operation, via the primary group of cells or the secondary group of cells;

set a location in a DCI format of a wake-up indication bit in a first position, where:

the UE a does not start a DRXOnDuration timer for a next long DRX cycle when a value of a 'physical downlink control channel (PDCCH) monitoring' bit is '0', and the UE a starts the DRXOnDuration for a next long DRX cycle when a value of the 'PDCCH monitoring' bit is '1'.

13. The user equipment of claim 12, wherein
a bitmap when the UE is provided a number of groups of configured secondary cells by secondary cell-groups-for-dormancy-outside-active-time occurs when:
a bitmap location is immediately after the 'PDCCH monitoring' bit location,
the bitmap size is equal to the number of groups of configured secondary cells where each bit of the bitmap corresponds to a group of configured secondary cells from the number of groups of configured secondary cells,
a '0' value for a bit of the bitmap indicates an active downlink bandwidth part (BWP), provided by a dormant BWP, for the UE for each activated secondary cell in the corresponding group of configured secondary cells, and
a '1' value for a bit of the bitmap indicates an active downlink BWP, provided by first-non-dormant-BWP-ID-for-DCI-outside-active-time, for the UE for each activated secondary cell in the corresponding group of configured secondary cells.

14. The user equipment of claim 13, wherein the P-DRX group of cells transmits using a lower frequency range relative to the S-DRX group of cells.

15. The user equipment of claim 13, wherein
the S-DRX group includes a first physical downlink control channel (PDCCH) monitoring scheme with a first repeating discontinuous reception (DRX) cycle, the first repeating DRX cycle including a first uplink/downlink traffic period and a first OnDuration period,
the P-DRX group includes a second physical downlink control channel (PDCCH) monitoring scheme with a second repeating discontinuous reception (DRX) cycle, the second repeating DRX cycle including a second uplink/downlink traffic period and a second OnDuration period, and
the first downlink period and the first OnDuration period is shorter than the second downlink period and the second OnDuration period, respectively.

16. The user equipment of claim 15, wherein a first length of the first repeating DRX cycle is the same as a second length of the second repeating DRX cycle.

17. The user equipment of claim 13, wherein the at least one processor is further configured to schedule the communications by,
activating one or more cells of the at least one second group of cells.

18. The user equipment of claim 13, wherein the at least one processor is further configured to schedule the communications by,
sending a command to one of more cells, of the at least one second group of cells, to cause the one or more cells to switch from dormant to non-dormant.

19. The user equipment of claim 12, wherein the first inactivity timer is a DRX-inactivity timer for a discontinuous reception (DRX) cycle of the S-DRX group of cells.

20. The user equipment of claim 19, wherein the at least one processor is further configured to:
receive a second indicator, the second indicator indicating that the at least one second group of cells is dormant, and
stop the first inactivity timer and a DRX OnDuration timer, based on the receiving of the second indicator.

21. The user equipment of claim 19, wherein the at least one processor is further configured to:
receive a second indicator, the second indicator indicating that the at least one second group of cells is dormant, and
ensure that a DRX OnDuration timer is not started, based on the receiving of the second indicator.

22. The user equipment of claim 12, wherein the first group of cells transmits at a lower frequency range relative to the at least one second group of cells.

* * * * *